US008036864B2

(12) United States Patent
Hwang et al.

(10) Patent No.: US 8,036,864 B2
(45) Date of Patent: Oct. 11, 2011

(54) METHOD FOR PREDICTING THE FORMATION OF SILICON NANOCRYSTALS IN EMBEDDED OXIDE MATRICES

(75) Inventors: Gyeong S. Hwang, Austin, TX (US); Decai Yu, Cottonwood Heights, UT (US)

(73) Assignee: The Board of Regents, The University of Texas System, Austin, TX (US)

( * ) Notice: Subject to any disclaimer, the term of this patent is extended or adjusted under 35 U.S.C. 154(b) by 1407 days.

(21) Appl. No.: 11/537,423

(22) Filed: Sep. 29, 2006

(65) Prior Publication Data

US 2007/0072318 A1    Mar. 29, 2007

Related U.S. Application Data

(60) Provisional application No. 60/722,315, filed on Sep. 29, 2005.

(51) Int. Cl.
*G06G 7/48* (2006.01)
(52) U.S. Cl. .............................................. 703/6; 703/12
(58) Field of Classification Search .................. 703/6, 12
See application file for complete search history.

(56) References Cited

U.S. PATENT DOCUMENTS

2002/0188373 A1* 12/2002 Goddard et al. .............. 700/200

OTHER PUBLICATIONS

Hamann, Energetics of silicon suboxides, The American Physical Society, vol. 61 No. 15, pp. 9899-9901.*

Bongiorno et al., Validity of the bond-energy picture for the energetics at Si-SiO2 interfaces, The American Physical Society, vol. 62 No. 24, pp. 326-329.*
Ng et al., Structure adn Oxidatio kinetics of teh Si(100)-SiO2 interface, Apr. 15, 1999, vol. 59, No. 15, pp. 132-137.*
Muller et al., Size and location control of Si nanocrystals at ion beam su=ynthesis in thin SiO2 films, Oct. 14, 2002, Applied Physics Letters, vol. 81 No. 16, pp. 3049-3051.*
Kanemitsu, Y. et al., "Visible photoluminescence from oxidized Si nanometer-sized spheres: Exciton confinement on a spherical shell," Physical Review B, Aug. 15, 1993, pp. 4883-4887, vol. 48, No. 7.
Kimberling, L. C. et al., "Monolithic Silicon Microphotonics," Topics in Applied Physics, 2004, pp. 89-121, vol. 94.
Pavesi, L. et al., "Optical gain in silicon nanocrystals," Nature, Nov. 23, 2000, pp. 440-444, vol. 408.
Pellegrino, P. et al., "Low-loss rib waveguides containing Si nanocrystals embedded in SiO2," Journal of Applied Physics, Mar. 25, 2005, pp. 074312-1 to 074312-8, vol. 97.
Rong, H. et al., "A continuous-wave Raman silicon laser," Nature, Feb. 17, 2005, pp. 725-728, vol. 433.
Tiwari, S. et al., "Single charge and confinement effects in nanocrystal memories," Applied Physics Letters, Aug. 26, 1996, pp. 1232-1234, vol. 69, No. 9.

(Continued)

*Primary Examiner* — Paul Rodriguez
*Assistant Examiner* — Bernard E Cothran
(74) *Attorney, Agent, or Firm* — Schwabe, Williamson & Wyatt, P.C.

(57) ABSTRACT

A method for predicting the formation of silicon nanocrystals in an oxide matrix is disclosed. Initially, fundamental data for a set of microscopic processes that can occur during one or more material processing operations are obtained. Kinetic models are then built by utilizing the fundamental data for a set of reactions that can contribute substantially to the formation of silicon nanocrystals in a silicon oxide matrix. Finally, the kinetic models are applied to predict shape, size distribution, spatial arrangements of silicon nanocrystals.

26 Claims, 8 Drawing Sheets

OTHER PUBLICATIONS

Walters, R. J. et al., "Silicon optical nanocrystal memory," Applied Physics Letters, Sep. 27, 2004, pp. 2622-2624, vol. 85, No. 13.

Wilson, W. L. et al., "Quantum Confinment in Size-Selected, Surface-Oxidized Silicon Nanocrystals," Science, Nov. 19, 1993, pp. 1242-1244, vol. 262, No. 5137.

Fernandez, B. G. et al., "Influence of average size and interface passivation on the spectral emission of Si nanocrystals embedded in SiO2," Journal of Applied Physics, Jan. 15, 2002, pp. 798-807, vol. 91, No. 2.

Ghislotti, G. et al., "Effect of different preparation conditions on light emission from silicon implanted SiO2 layers," Journal of Applied Physics, Jun. 1, 1996, pp. 8660-8663, vol. 79, No. 11.

Muller, T. et al., "Size and location control of Si nanocrystals at ion beam synthesis in thin SiO2 films," Applied Physics Letters, Oct. 14, 2002, pp. 3049-3051, vol. 81, No. 16.

Shimizu-Iwayama, T. et al., "Optical properties of silicon nanoclusters fabricated by ion implantation," Journal of Applied Physics, Jun. 1, 1998, pp. 6018-6022, vol. 83, No. 11.

Skorupa, W. et al., "Room-temperature, short-wavelength (400-500 nm) photoluminescence from silicon-implanted silicon dioxide films," Applied Physics Letters, Apr. 22, 1996, pp. 2410-2412, vol. 68, No. 17.

Yu, D. et al., "Structure and diffusion of excess Si atoms in SiO2," Physical Review B, Nov. 14, 2005, pp. 205204-1 to 205204-5, vol. 72.

Brunet-Bruneau, A. et al. "Microstructural characterization of ion assisted SiO2 thin films by visible and infrared ellipsometry," Journal of Vacuum Science and Technology A, Jul. 1998, pp. 2281-2286, vol. 16, No. 4.

Laaziri, K. et al., "High-energy x-ray diffraction study of pure amorphous silicon," Physical Review B, Nov. 15, 1999, pp. 13 520 to 13 533, vol. 60, No. 19.

Tu, Y. et al., "Structure and Energetics of the Si-SiO2 Interface," Physical Review Letters, May 8, 2000, pp. 4393-4396, vol. 84, No. 19.

Wooten, F., "Computer Generation of Structural Models of Amorphous Si and Ge," Physical Review Letters, Apr. 1, 1985, pp. 1392-1395, vol. 54, No. 13.

Kresse, G. et al., "Vienna Ab-Initio Simulation Package (VASP): VASP the Guide," University of Vienna, Vienna, Austria, 2001, available at http://cms.mpi.univie.ac.at/vasp/vasp/vasp.html.

Monkhorst, H. J. et al., "Special points for Brillouin-zone integrations," Physical Review B, Jun. 15, 1976, pp. 5188-5192, vol. 13, No. 12.

Perdew, J. P. et al., "Accurate and simple analytic representation of the electron-gas correlation energy," Physical Review B, Jun. 15, 1992, pp. 13 244 to 13 249, vol. 45, No. 23.

Vanderbilt, D., "Soft self-consistent pseudopotentials in a generalized eigenvalue formalism," Physical Review B, Apr. 15, 1990, pp. 7892-7895, vol. 41, No. 11.

Bongiorno, A. et al., "Validity of the bond-energy picture for the energetics at Si-SiO2 interfaces," Physical Review B, Dec. 15, 2000, pp. 16 326 to 16 329, vol. 62, No. 24.

Hamann, D. R., "Energetics of silicon suboxides," Physical Review B, Apr. 15, 2000, pp. 9899-9901, vol. 61, No. 15.

Tsoukalas, D. et al., "Diffusivity measurements of silicon in silicon dioxide layers using isotopically pure material," Journal of Applied Physics, Jun. 15, 2001, pp. 7809-7813, vol. 89, No. 12.

Henkelman, G. et al., "A climbing image nudged elastic band method for finding saddle points and minimum energy paths," Journal of Chemical Physics, Dec. 8, 2000, pp. 9901-9904, vol. 113, No. 22.

Mills, G. et al., "Quantum and Thermal Effects in H2 Dissociative Adsorption: Evaluation of Free Energy Barriers in Multidimensional Quantum Systems," Feb. 14, 1994, pp. 1124-1128, vol. 72, No. 7.

Kirichenko, T. A. et al., "Silicon interstitials at Si/SiO2 interfaces: Density functional calculations," Physical Review B, Jul. 29, 2005, pp. 035345-1 to 035345-6, vol. 72, No. 3.

Taniguchi, K. et al., "Theoretical model for self-interstitial generation at the Si/SiO2 interface during thermal oxidation of silicon," Journal of Applied Physics, Apr. 1, 1989, pp. 2723-2727, vol. 65, No. 7.

Mikkelsen, J. C., "Self-diffusivity of network oxygen in vitreous SiO2," Applied Physics Letters, Dec. 1, 1984, pp. 1187-1189, vol. 45, No. 11.

* cited by examiner

METHOD FOR PREDICTING THE FORMATION OF SILICON NANOCRYSTALS IN EMBEDDED OXIDE MATRICES

This application claims priority under 35 U.S.C. §119(e)(1) to provisional application No. 60/722,315 filed on Sep. 29, 2005, the contents of which are incorporated herein by reference.

BACKGROUND OF THE INVENTION

1. Technical Field

The present invention relates to semiconductor modeling in general, and in particular to a method for predicting properties resulting from processes used in the preparation of semiconductor materials. Still more particularly, the present invention relates to a method for predicting the formation of silicon nanocrystals in oxide matrices.

2. Description of Related Art

Silicon (Si) is an indirect gap material that yields a very low efficiency for luminescence. However, the discovery of efficient room temperature luminescence from low-dimensional Si structures (such as oxide embedded Si nanocrystals) led to the rapid evolution of Si microphotonics. Key advantages of Si-based materials processing include high-yield and low-cost production established in microelectronics.

The discovery of efficient room temperature luminescence from Si nanocrystals embedded in a $SiO_2$ matrix has generated significant interest in the embedded Si nanocrystals system because of its potential applications in electronic, optoelectronic, and optical devices in Si-compatible technology. Earlier experimental investigations have suggested the absorption and luminescence properties of the embedded nanocrystal systems would be governed by a complex combination of: nanocrystal sizes, shapes, and size distributions; crystal-matrix interface structures, bonding, and defects; and matrix structure and composition. This may imply that atomic-level control of such structural properties, together with accurate assessment of structure-property relationships, would offer great opportunities in the development of Si-nanocrystal based novel devices. However, many fundamental aspects of the synthesis of oxide embedded Si nanocrystals are still poorly understood, despite significant efforts over recent years.

Experiments may provide many clues to the atomistic properties and behaviors involved in the synthesis and characterization of nanostructured materials, but their interpretations often remain controversial due largely to difficulties in direct measurement. While current experimental techniques are still limited to providing complementary atomic-level, real space information, comprehensive multiscale modeling based on first principles quantum mechanics, with proper experimental validation, can contribute greatly to the understanding of the underlying mechanisms of the synthesis and manipulation. With such understanding, it would be possible to provide a method for predicting the formation of silicon nanocrystals in oxide matrices.

SUMMARY OF THE INVENTION

In accordance with a preferred embodiment of the present invention, fundamental data for a set of microscopic processes that can occur during one or more material processing operations are initially obtained. Kinetic models are then built by utilizing the fundamental data for a set of reactions that can contribute substantially to the formation of silicon nanocrystals in a silicon oxide matrix. Finally, the kinetic models are applied to predict shape, size distribution, spatial arrangements of silicon nanocrystals.

All features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
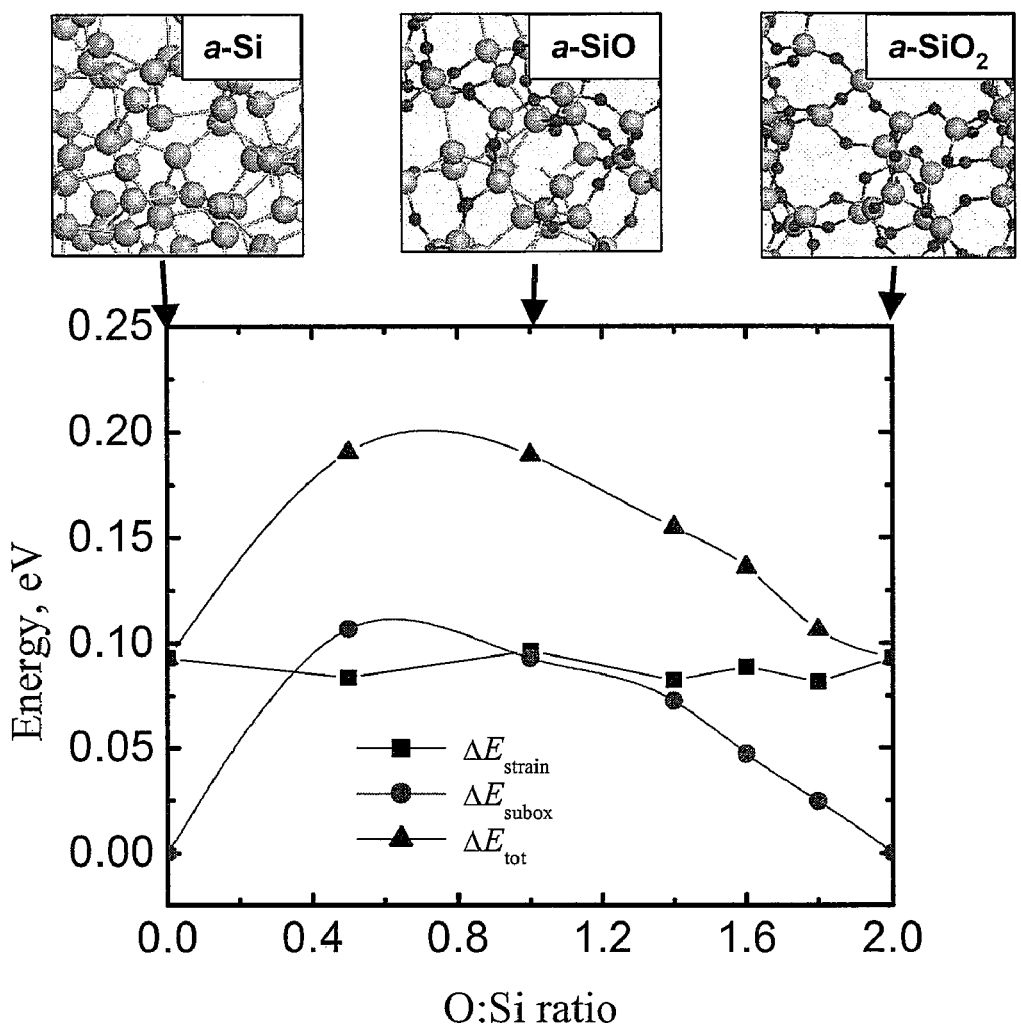
FIG. 1 shows the variation of the relative energies of a-$SiO_x$.

The present invention provides a method for predicting from first principles as a function of synthesis and operation conditions: the shape, size distribution, spatial arrangement of oxide embedded silicon nanocrystals; the chemical composition of oxide matrices; and the structure of nanocrystal-matrix interfaces. The computational techniques can include: first principles quantum mechanics (QM); first principles-based force fields (FF); classical FF-based molecular mechanics (MM) and Metropolis Monte Carlo (MMC); and kinetic Monte Carlo (kMC) based on parameters extracted from QM, MM, MMC calculations, and elsewhere. QM calculations can be used to predict the relative energies of suboxide matrices as a function of the silicon:oxygen (Si:O) ratio and the formation and structure of single oxygen (O) and silicon (Si) atoms in the suboxide systems. The QM calculations can also provide information on the rates of diffusion of Si and O atoms in Si-rich oxide matrices. The parameters of classical FFs, mostly Keating-like potentials, can be optimized based on first principles QM results. MMC can be used to construct amorphous suboxide structures. Finally, kMC simulations based on the fundamental data extracted from QM, MM, and MMC simulations, can be used to predict: the shape, size distribution, spatial arrangement of oxide embedded silicon nanocrystals; the chemical composition of oxide matrices; and the structure of nanocrystal-matrix interfaces, as a function of processing conditions.

Oxide embedded Si nanocrystals have largely been synthesized by high-temperature annealing of Si-rich $SiO_2$. Thus far, the nanocrystal formation has been described by a sequence of fundamental processes such as nucleation, growth, and Ostwald ripening of Si precipitates in the oxide matrix. However, such model often fails to explain experimental observations, including strong dependence of Si cluster size on initial Si supersaturation and rapid formation of Si clusters at the early stages of annealing with very slow ripening. According to the Ostwald ripening theory, the cluster size is primarily determined by the difference in thermal stability between different sizes of clusters, rather than the initial condition. In addition, the major driving force for the nanocrystal formation has not been clarified.

Recent theoretical studies have predicted that excess Si atoms in amorphous $SiO_2$ are likely to be incorporated into the Si—O bond network, rather than undergo diffusion and agglomeration. This implies that the Si cluster formation in a Si suboxide matrix can be attributed primarily to a chemical phase separation into Si and $SiO_2$. Thus, the total energy change of model suboxide matrices is examined by varying the Si:O ratio in order to identify the major driving force for the phase separation.

The continuous random network (CRN) model is utilized to construct defect-free amorphous suboxide model structures. Each periodic suboxide supercell includes 75 atoms of Si and O with a volume (V) given by:

$$V = V_{Si} \times (N_{Si} - N_O/2) + V_{SiO2} \times N_O/2$$

where $N_{Si}$ and $N_O$ are the number of Si and O atoms in the supercell and $V_{Si}$ and $V_{SiO2}$ are the unit volume of amorphous Si (a-Si) and amorphous $SiO_2$ (a-$SiO_2$). The values of $V_{Si}$ and $V_{SiO2}$ are extracted respectively from corresponding experimental densities of 2.28 g/cm$^3$ and 2.2 g/cm$^3$. Starting with a totally randomized configuration, each suboxide system was relaxed via a sequence of bond switching based on the Metropolis Monte Carlo (MMC) sampling method. Using Keating-like potentials, bond transpositions were performed at the system temperatures of 5000 K, 3000 K and 1000 K sequentially with 850N, 600N, and 200N trials, respectively, where N is the total number of atoms in the supercell. From these calculations, an average bond angle of ≈109.2°, and bond angle deviation of ≈10° for a-Si; and the average Si—O—Si bond angle of ≈136° and bond angle deviation of ≈15° for a-$SiO_2$ are obtained. These structural factors are in good agreement with experiments.

The planewave density functional theory (DFT) program VASP is utilized to further relax the CRN model structures and reevaluate their total energies. The electron-electron exchange and correlation was described within the generalized gradient approximation (PW91). Vanderbilt-type ultrasoft pseudopotentials were used for both Si and O atoms. A planewave cutoff energy of 300 eV was used. The convergence of atomic structure and energetics was carefully checked by changing the cutoff energy to 400 eV and 450 eV, but the variation in relative energies turns out to be less than 0.1 eV, with unnoticeable changes in atomic configurations. A (2×2×2) mesh of k points is used in the scheme of Monkhorst-Pack for the Brillouin zone sampling. All atoms were fully relaxed using the conjugate gradient method until residual forces on constituent atoms become smaller than 0.02 eV/Å.

FIG. 1 shows the variation of the relative energies of a-$SiO_x$ (x=0–2) with respect to the Si—Si and Si—O bond energies respectively from c-Si and c-$SiO_2$ (β-crystobalite). Here, for each Si:O ratio, only the average values from six different atomic configurations considered are presented. The energy increases can be decoupled in terms of the changes of suboxide energies and strain energies:

$$\Delta E_{total} = \Delta E_{subox} + \Delta E_{strain}$$

The suboxide (penalty) energy ($\Delta E_{subox}$) can represent the increase in Si—Si and Si—O bond energies due to incomplete O coordination. For a given suboxide system, the total suboxide energy can be evaluated by adding the suboxide penalty energies associated to the Si atoms in intermediate oxidation states (+1, +2, +3). Using periodic $Si^{1+}$, $Si^{2+}$, and $Si^{3+}$ model structures (FIG. 2), the penalty energies of 0.53 eV, 0.56 eV, and 0.28 eV are obtained for $Si^{1+}$, $Si^{2+}$, and $Si^{3+}$, respectively.

The strain energy ($\Delta E_{strain}$) represents the increase in energy arising from lattice distortions, associated with bond stretching, bond angle bending, torsion strain, and non-bonding interactions (such as van der Waals interaction and electrostatic interaction). Here, for each Si:O system ($\Delta E_{strain}$ is simply estimated by subtracting $\Delta E_{subox}$ from $\Delta E_{total}$.

As shown in FIG. 1, the suboxide energy varies in a parabolic fashion, while the strain energy changes insignificantly with the Si:O ratio. This clearly demonstrates that the phase separation in a suboxide matrix is mainly driven by suboxide penalty, with a minor contribution of strain. Interface strains induced by the volume mismatch between Si and SiOx may influence the structural evolution of small Si clusters (less than 1-2 nanometers diameter) in which the interface effect can be significant).

The phase separation will take place by the diffusion of constituent atoms in the suboxide matrix, such as either Si or O atoms, or both. Suppose that oxygen undergoes diffusion via O-hopping from a Si—Si bond center to another (which corresponds to O-vacancy diffusion), the diffusion barrier turns out to be a strong function of the oxidation state of the three Si neighbors. The predicted barrier varies from 2.6 eV, 3.9 eV, to 4.4 eV, respectively, for crystalline $Si^{1+}$, $Si^{2+}$, and $Si^{3+}$ model structures. The diffusion barrier for single O vacancies increases further to 4.6 eV in c-$SiO_2$. The O-diffusion barriers were calculated using the nudged elastic band method (NEBM).

Using DFT-GGA calculations, a novel pathway is identified for excess Si diffusion in a-$SiO_2$, which involves: diffusion and pairing of two O-vacancies to form a four-coordinate (FC) $Si^{2+}$ state; and reconfiguration from the FC state to the bond center (BC) state where the Si atom is located at a Si—O bond center. The predicted barrier of 4.5–5.2 eV is in good agreement with experimental estimations of 4.74±0.25 eV. In addition, Si diffusion would also take place by forming Si—O pairs.

These results imply that Si and O could diffuse at rates with the same order of magnitude in a highly-oxidized suboxide region during high-temperature thermal treatment. In fact, the Si and O diffusion behavior is expected to be more complex than considered here given the possible existence of a large density of defects in a-$SiO_2$. Irrespective of this, recent DFT-GGA calculations have predicted that excess Si atoms thermodynamically favor a-$SiO_2$ regions, rather than c-Si regions (or c-Si/a-$SiO_2$ interfaces). This is consistent with experimental observations that most of the Si atoms emitted from the Si—$SiO_2$ interface during thermal oxidation migrate into the $SiO_2$ part. Hence, the phase separation is expected to be controlled primarily by oxygen out-diffusion from Si-rich regions, rather than excess Si diffusion and agglomeration.

Figure 3:
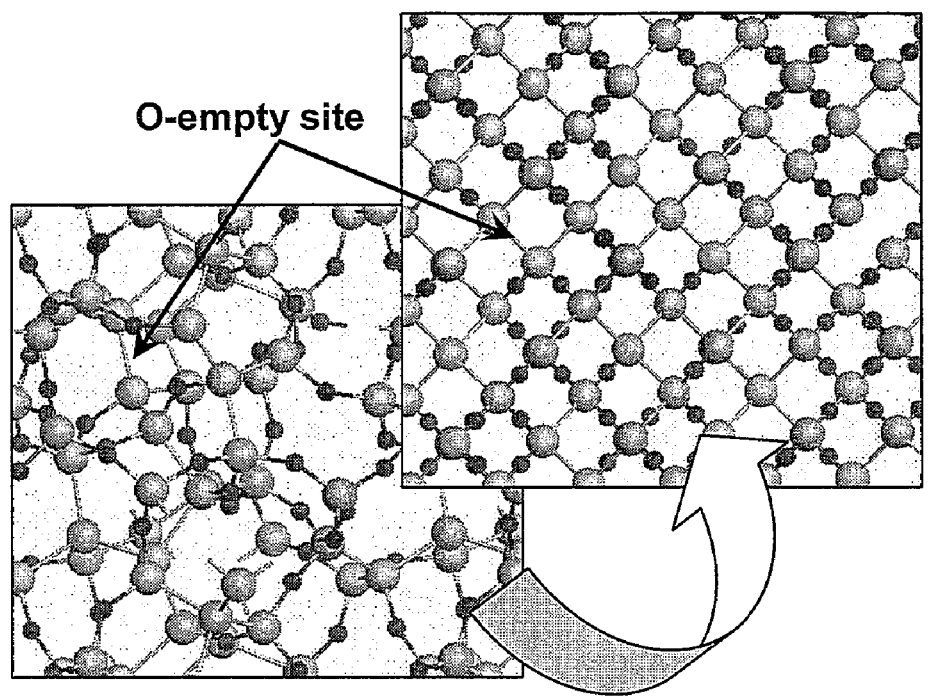
FIG. 3 is an illustration of structural models for Si suboxide model used in kMC simulations.

Based on these fundamental findings, we developed a kinetic model for the formation of Si clusters in a Si suboxide matrix. Given that strain and Si diffusion play a minor role, as illustrated in FIG. 3, (1) an amorphous suboxide structure can be simplified using a rigid diamond-lattice model, with Si atoms at lattice sites and O atoms at Si—Si bond centers and (2) only O atoms are allowed to diffuse around through O-empty sites. The oxidation state of each Si atom is evaluated by counting the number of its next neighboring O atoms. The magnitude of Si supersaturation is controlled by varying the number of O-empty sites.

Figure 2:
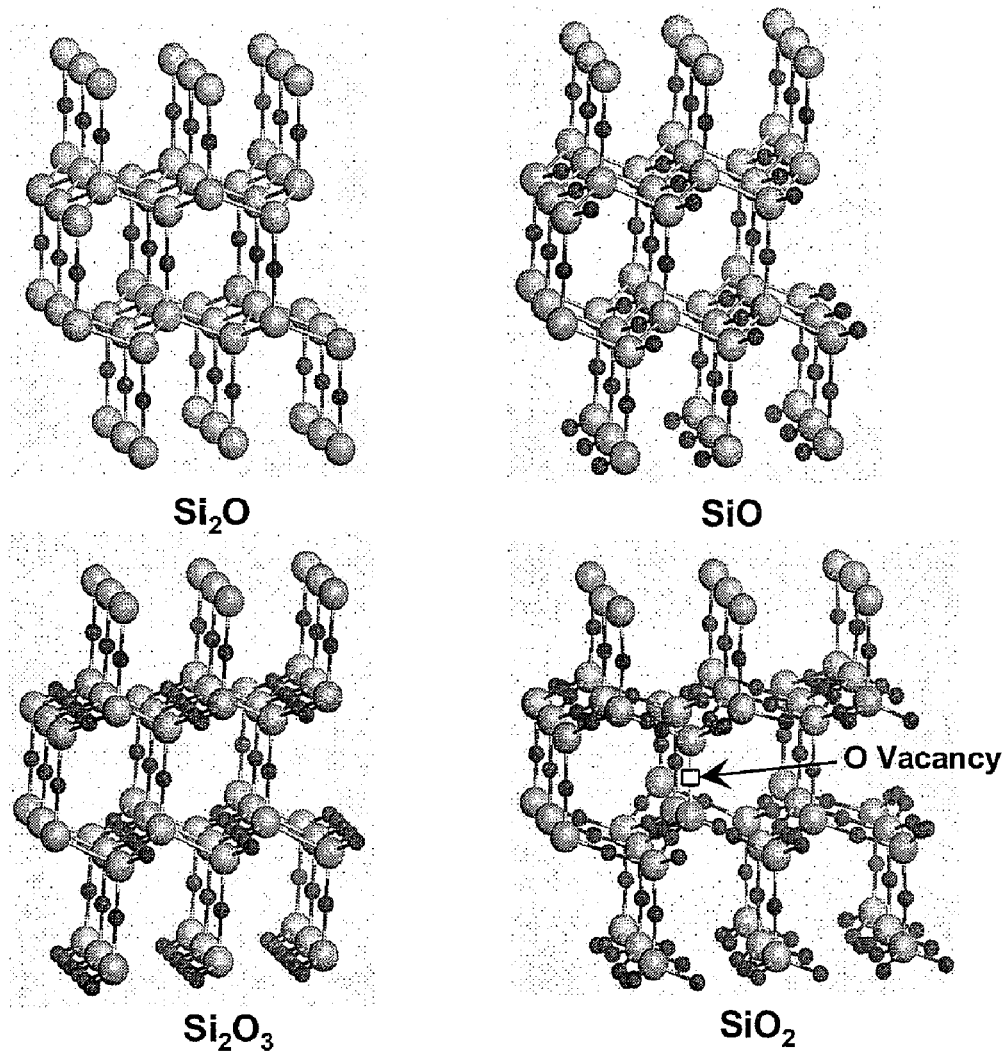
FIG. 2 is an illustration of structural models for $Si_2O$, $SiO$, $Si_2O_3$ yielding Si atoms in +1, +2 and +3 oxidation states, respectively.

For kinetic Monte Carlo (KMC) simulations, the barrier for O diffusion is given in terms of the oxidation states of three Si neighbors, i.e., $Si_A$, $Si_B$, and $Si_C$. $Si_A$ has four different oxidation states (from $Si^{1+}$ to $Si^{4+}$), $Si_B$ three oxidation states (from $Si^{1+}$ to $Si^{3+}$), and $Si_C$ four oxidation states (from $Si^0$ to $Si^{3+}$). Hence, there are 48 (=4×3×4) combinations of oxidation states. Here, the diffusion barriers is estimated by interpolating O diffusion barriers that are computed for the crystalline $Si^{1+}$, $Si^{2+}$, $Si^{3+}$ model systems, as well as barriers for O diffusion in crystalline Si and O-vacancy diffusion in crystalline $SiO_2$ (FIG. 2). For each of the total oxidation states (of the three Si neighbors), we take the state with the highest suboxide energy as basis; that is, the corresponding barrier is approximated from the interpolation of the computed barriers. Having lower suboxide energies, relative diffusion barriers are estimated considering the energy gain with respect to the basis of each total oxidation state. For instance, O diffusion from the oxidation state of $(S_A, S_B, S_C=+1, +1, +1)$ to $(0, +1, +2)$ is assumed to require overcoming a barrier of 2.64 eV, with a return barrier of 3.14 eV $(=2.64-\Delta E_{subox}$, where the suboxide energy difference between the initial and the final states is $\Delta E_{subox}=-0.5$ eV).

In addition, a penalty-energy of 0.5 eV is given when an O atom diffuses into a crystallized Si region. This is to take into account the energy gain from the existence of an O atom in a-Si with respect to c-Si, which is predicted to be approximately 0.5 eV according to DFT-GGA calculation. While no definitive kinetic model for embedded Si cluster crystallization is available, assuming Si clusters is larger than 2 nm diameter are crystallized within a few seconds of annealing.

With the approximated barriers, O diffusion rates are evaluated by:

$$D=D_0\exp(-E_m/kT),$$

where $D_0$ is the prefactor, $E_m$ is the diffusion barrier, k is the Boltzman constant, and T is the substrate temperature. Here, the prefactor $D_0$ is assumed to be 2.6 cm²/s. At each step, an event was chosen to take place according to its probability, and the KMC time ($t_{KMC}$) is advanced by:

$$\Delta t_{KMC}=l-1 nZ/\Sigma Ri$$

where Z is a random number ranging from 0 to 1, $R_i[=v_o\exp(-E_m/kT)]$ is the rate constant for the $i^{th}$ event. The effective O jumping frequency is given as $v_0=(6D_0/\lambda^2)^{1/2}$, where the jumping distance $\lambda$ is set to be 2.6 Å.

This simplified diffusion model should be sufficient for clarifying the underlying mechanism of embedded Si nanocluster formation. However, a further investigation into embedded cluster crystallization and O diffusion rates at various oxidation/defect conditions is required to develop an improved kinetic model for the structural evolution of embedded Si clusters.

Using the kinetic model, KMC simulations are performed for three different Si supersaturations of 10%, 20%, and 30%.

Figure 4:
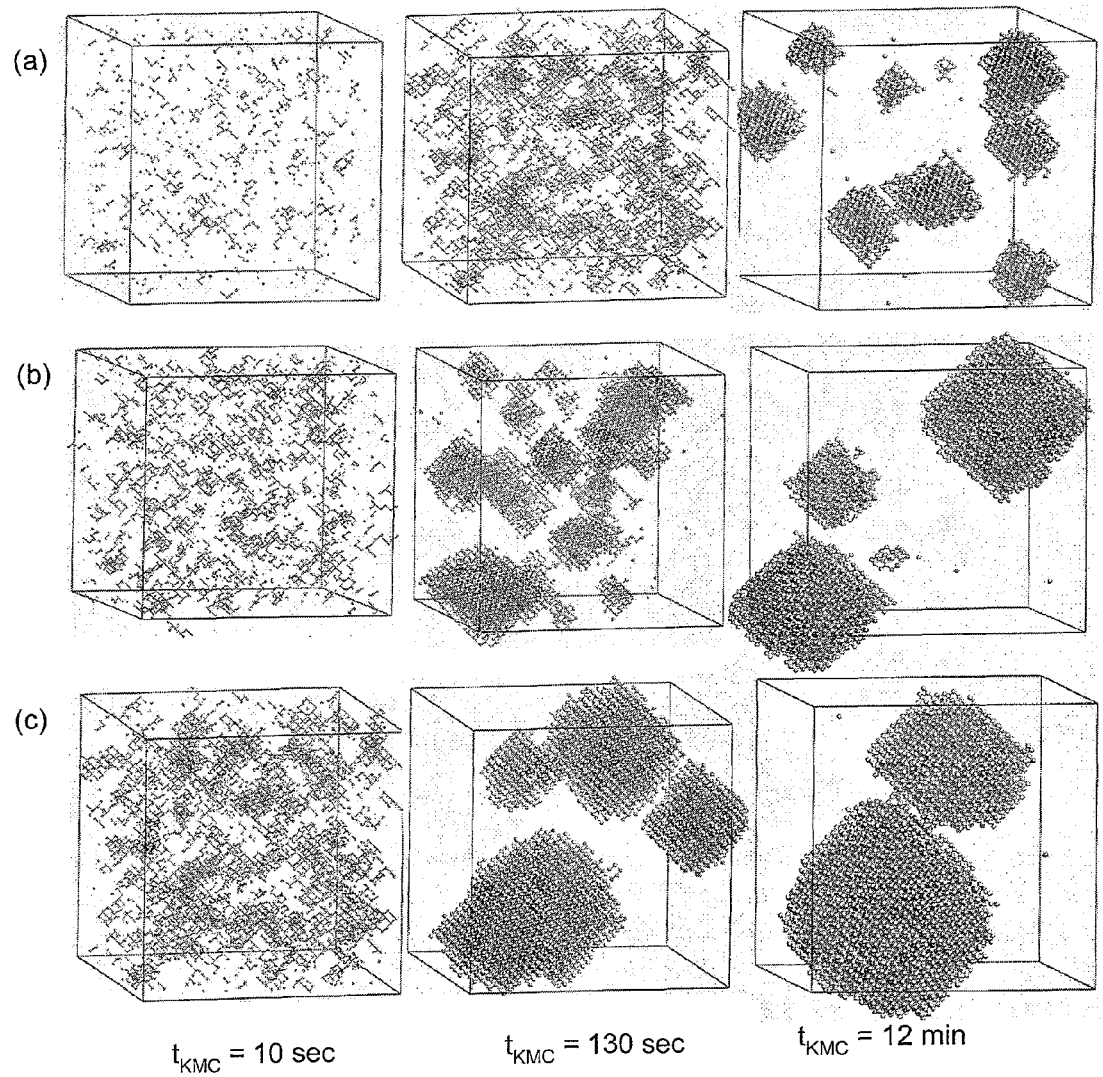
FIG. 4 is a set of kMC simulations of phase separation in Si suboxide.

FIG. 4 shows snapshots from the simulations. Here, while the number of Si atoms (at the lattice sites) is kept constant at 27,000, the number of O atoms (at the BC sites) varies according to the Si:O ratio. Initially O atoms are randomly distributed in each system. For the same MC annealing time (tKMC) at 1373 K, the diameter of Si clusters increases substantially with the degree of supersaturation, consistent with experiments.

Based on the KMC simulation results, it is clear that at the initial stage of annealing, a number of small Si clusters start to form via O out-diffusion. The high-density small clusters join together to become bigger, with continued O out diffusion from Si rich regions. These small clusters evolve into a somewhat elongated shape, rather than a compact shape. As the size of clusters becomes larger while the cluster density gets lower, the Si clusters rearrange to form a compact configuration. KMC simulations clearly demonstrate the Si cluster formation occurs rapidly by O out-diffusion from Si-rich regions at the early stages of annealing.

Figure 5:
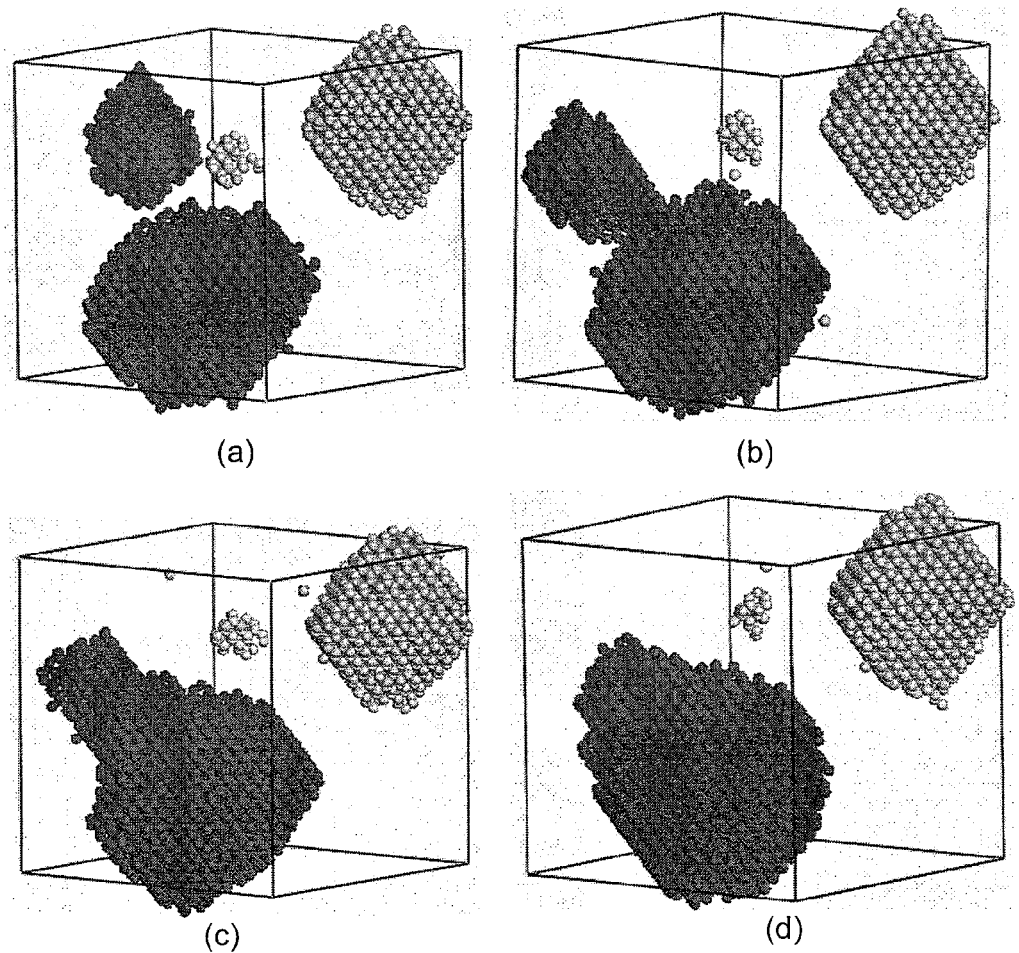
FIG. 5 is an illustration of a coalescence-like behavior occurred in a KMC simulation of phase separation in Si suboxide.

As shown in FIG. 5, when two clusters exist closely with a sufficient amount of O-vacancies between them, they can be connected via O out-diffusion from the gap region. The combined cluster rearranges itself to form a compact shape through O diffusion along the cluster-matrix interface. This, in turn, lowers the energy by reducing the interface area. Note that the interface commonly has a higher suboxide energy. This may look like a conventional coalescence process, however these clusters do not move towards each other as mentioned above. Hereafter, this growth process is referred to as "coalescence-like," as opposed to conventional coalescence. The coalescence-like behavior is mainly responsible for the Si cluster growth at the early stages of annealing where the density of clusters is sufficiently high such that they exist closely to each other.

Figure 6:
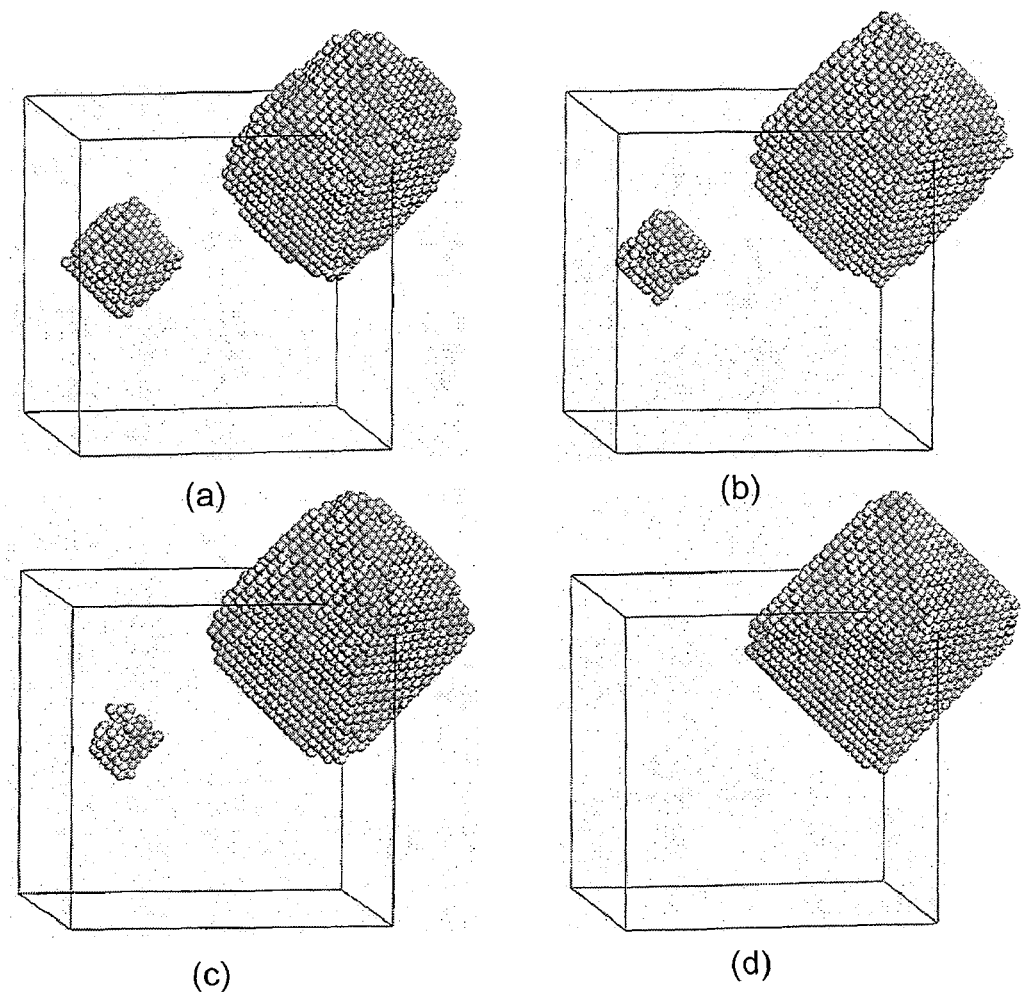
FIG. 6 is an illustration of a pseudo Ostwald Ripening behavior occurred in a KMC simulation of phase separation in Si suboxide.

As shown in FIG. 6, KMC simulations identified that larger Si clusters can grow at the expense of smaller ones. This phenomenon resembles "Ostwald ripening," however it turns out that the smaller clusters disappear by reoxidation, not by dissolution. That is, when the oxidation state of the suboxide matrix increases as a result of an increase in the degree of phase separation, smaller Si clusters can be reoxidized while larger clusters grow during high temperature annealing. This growth behavior is referred to as "pseudo Ostwald ripening," as opposed to conventional Ostwald ripening. This pseudo ripening process becomes important when the density of clusters is low so that they are separated by large distances. However, this ripening turns out to take place several orders of magnitude slower than the "coalescence-like" growth. This is not surprising considering the difficulty in the reoxidation of crystallized Si nanoclusters. The results suggest that the prevailing "coalescence-like" behavior is responsible for a big variation in the Si cluster size in terms of the Si:O ratio.

Figure 7:
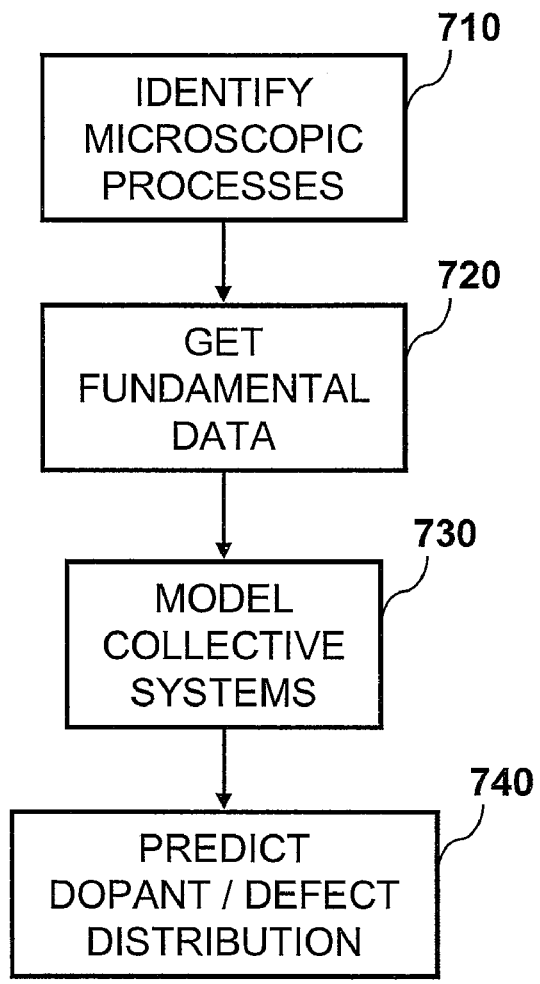
FIG. 7 is a high-level logic flow diagram of a method for modeling semiconductor processing.

With reference now to FIG. 7, there is depicted a high-level logic flow diagram of a method for modeling semiconductor processing, in accordance with a preferred embodiment of the present invention. Initially, one or more microscopic processes that may occur during a processing operation are identified, as shown in block 710. Processing operations may include any conventional techniques used in the processing of semiconductor materials, such as the implantation of As into a silicon lattice. The microscopic processes can include any processes that may occur during the operation, including the association of dopants, substrate atoms, and/or impurities to form clusters or complexes, the diffusion of such complexes and dopant components, the dissociation of complexes, and the like. Next, fundamental data are obtained for the microscopic processes of interest, as depicted in block 720. Quantum mechanics (QM) calculations can be used in this step to predict the energetics and structures for the various states, the barriers for the various processes in which atoms and defects move from site to site, and the other data required to predict the rates of various processes such as diffusion, association and dissociation. This can be done by calculating the relative energy of the various stable structures and the activation energies and entropies for the various dynamic and kinetic processes that connect the various sites.

Fundamental rate parameter data, obtained from QM calculations or from molecular dynamics (MD) calculations, are used to model the characteristics of collective systems incorporating distributions of several or many kinds of defects and impurities using molecular dynamics, as shown in block 730. In one implementation, these calculations are performed using kinetic Monte Carlo (kMC) dynamics. The kMC simulation provides information about the long-term consequences of defect/dopant reactions, indicating which clusters constitute major components and identifying the important reaction pathways.

The fundamental data (e.g., data from the QM calculations from block 720) and reaction information (e.g., information from the kMC dynamics calculations from block 730) are used to predict the distributions of dopant and defect components and clusters, as depicted in block 740. Equilibrium and non-equilibrium distributions of these components are predicted as a function of initial concentrations, temperature, and other external conditions (e.g., stress, voltage, magnetic fields, electromagnetic fields, temperature profiles, external radiation). The predicted distributions are solved as a function of time and processing conditions with a hierarchy of methods that in addition to the atomistic approaches (QM, MD) mentioned above may involve partial differential equations using finite elements and continuum approaches along with atomistic conditions.

Processing operations can involve many components, including dopants, defects and clusters or complexes as discussed above, the concentrations of which at a given time can be interdependent. For example, ion implantation of boron in a silicon lattice creates many species, including substitutional and interstitial boron atoms, interstitial silicon atoms, vacancies, and clusters of various numbers of boron and silicon atoms. Some of these species, referred to here as fast species or components, can have very high diffusivity or dissociation rates (which can be estimated according to the diffusion energy barrier and binding energy, respectively), such that the local concentration of these species will vary significantly with time as they either diffuse away or dissociate into other components.

As the system evolves in time, some fast processes may achieve a steady state in which the relative concentrations are nearly constant with only the overall population changing slowly with time. In such circumstances the atomistic dynamics may be replaced with a constitutive equation whose parameters are determined from the atomistic equations. This can allow the longer time phenomena to be described in terms of a mesoscopic or continuum equation, greatly extending the time and length scales that are practical.

In accordance with a preferred embodiment of the present invention, a method for predicting the formation of silicon nanocrystals in an oxide matrix begins with the gathering of fundamental data for a set of microscopic processes that can occur during one or more material processing operations. Kinetic models are then built by utilizing the fundamental data for a set of reactions that can contribute substantially to the formation of silicon nanocrystals in a silicon oxide matrix. Finally, the kinetic models are applied to predict shape, size distribution, spatial arrangements of silicon nanocrystals.

The fundamental data can be obtained by calculating changes in the total energy of silicon suboxide matrices by varying the silicon: oxygen (Si:O) ratio to determine the major driving force, either strain energy or suboxide penalty energy, for the chemical phase separation to silicon and silicon dioxide. The strain energy represents the increase in energy arising from lattice distortions, associated with bond stretching, bond angle bending, torsion strain, and non-bonding interactions. The suboxide penalty energy represents the increase in Si—Si and Si—O bond energies due to incomplete O coordination.

The fundamental data can also obtained by calculating the formation energies of single Si atoms that exist in excess at various states in the oxide matrix to determine if they are fully incorporated into a Si—O bond network. In addition, the fundamental data can also obtained by calculating the relative formation energies of single Si atoms in the crystalline silicon, the amorphous suboxide matrix, and the nanocrystal-matrix interface to determine a location at which excess Si atoms prefer to remain.

The relative formation energy of single Si atoms is substantially greater in an amorphous suboxide matrix than in a crystalline Si bulk or at a nanocrystal-matrix interface.

The kinetic models are built by simplifying an amorphous suboxide structure using a rigid diamond-lattice model, with silicon atoms at lattice sites and oxygen atoms at Si—Si bond centers. The kinetic models can also be built by permitting only oxygen atoms to diffuse around through oxygen-empty sites.

The diffusion of O atoms is determined by calculating the corresponding activation energies in terms of the oxidation states of Si neighbors that are directly involved in an oxygen diffusion. The nanocrystal formation can be predicted by using kinetic Monte Carlo simulations based on oxygen diffusion. The kinetic Monte Carlo simulations include an evaluation of the oxidation state of each Si atom by counting the number of its next neighboring O atoms. The kinetic Monte Carlo simulations also include controlling the magnitude of Si supersaturation by varying the number of O-empty sites.

The strain energy varies insignificantly from 0.05 eV to 0.15 eV per Si atom in a suboxide matrix, with respect to the Si:O ratio. The suboxide penalty energies are approximately 0.5 eV, 0.5 eV, and 0.3 eV for Si1+=Si2+, and Si3+, respectively.

As has been described, the present invention provides a method for predicting the formation of silicon nanocrystals in oxide matrices.

Figure 8:
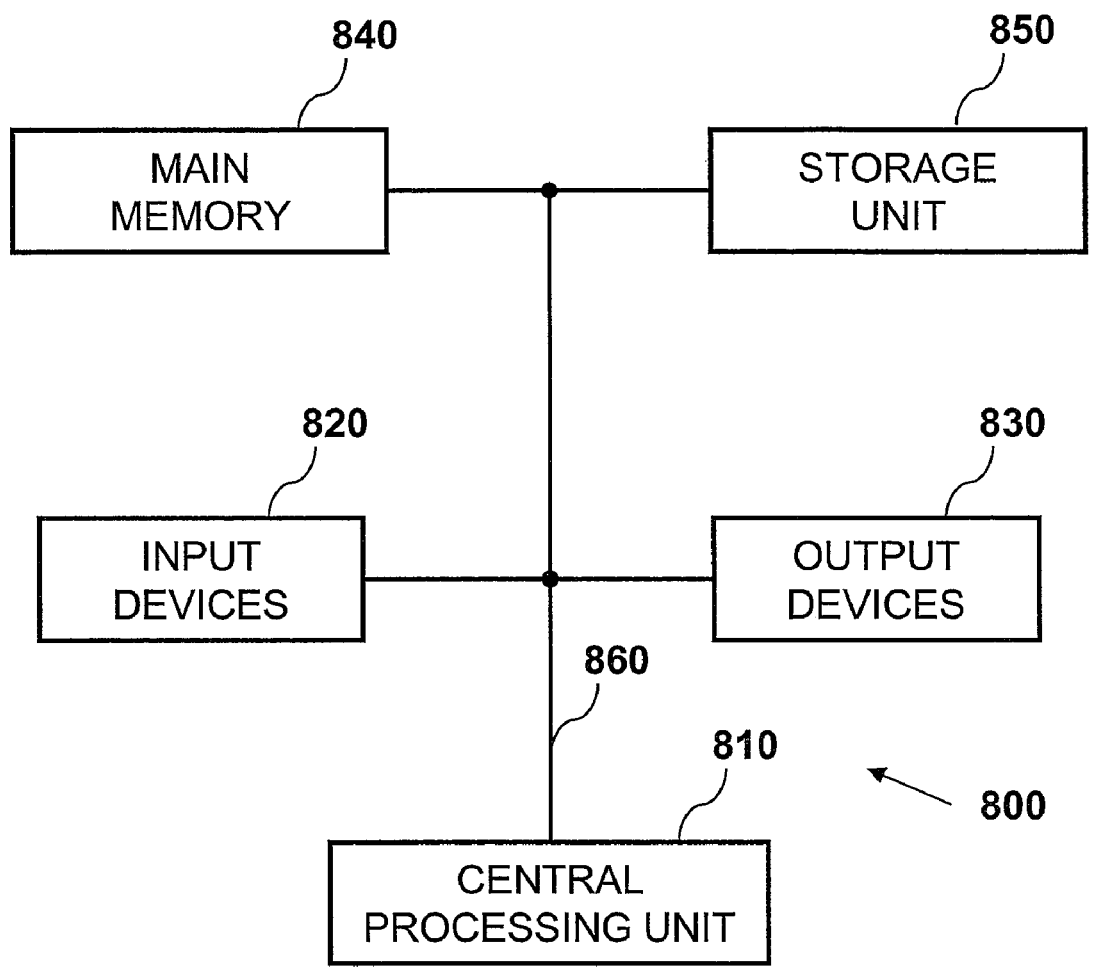
FIG. 8 is a block diagram of a computer system suitable for carrying out various functions of the present invention.

The method of the present invention may be implemented in a computer program product tangibly embodied in a computer-usable medium. With reference now to FIG. 8, there is illustrated a block diagram of a computer system suitable for carrying out various functions of the present invention. As shown, a computer system 800 includes a central processing unit 810, input devices 820, output devices 830, a main memory 840, and a storage unit 850, all connected to a system bus 860. Input devices 820 can be a keyboard and a mouse; and output devices 830 can be a monitor and a printer. Main memory 840 can be a dynamic random access memory; and storage unit 850 can be a hard disk.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method, comprising:
generating, using a computing device, from fundamental data representative of processes that can occur in an oxide matrix during one or more material processing operations on the oxide matrix, a kinetic model representative of reactions that contribute substantially to formation of silicon nanocrystals in the oxide matrix; and
generating from the kinetic model, by the computing device, data representative of a profile for the formation of the silicon nanocrystals in the oxide matrix, including predicting the formation of the silicon nanocrystals using kinetic Monte Carlo simulations based at least in part on oxygen diffusion.

2. The method of claim 1, further comprising generating, using the computing device, the fundamental data representative of processes that can occur in the oxide matrix during the one or more material processing operations on the oxide matrix, wherein said generating the fundamental data includes calculating changes in a total energy of silicon suboxide matrices by varying a Si:O ratio to determine a strain energy or a suboxide penalty energy for a chemical phase separation of silicon and silicon dioxide.

3. The method of claim 2, wherein the strain energy represents an increase in energy arising from lattice distortions associated with bond stretching, bond angle bending, torsion strain, and non-bonding interactions.

4. The method of claim 2, wherein the suboxide penalty energy represents an increase in Si—Si and Si—O bond energies due to incomplete O coordination.

5. The method of claim 1, further comprising generating, using the computing device, the fundamental data representative of the processes that can occur in the oxide matrix during the one or more material processing operations on the oxide matrix, wherein said generating the fundamental data includes calculating formation energies of single Si atoms that exist in excess at various states in the oxide matrix to determine incorporation of single Si atoms in a Si—O bond network.

6. The method of claim 1, further comprising generating, using the computing device, the fundamental data representative of the processes that can occur in the oxide matrix during the one or more material processing operations on the oxide matrix, wherein said generating the fundamental data includes calculating relative formation energies of single Si atoms in a crystalline silicon, an amorphous suboxide matrix, and a nanocrystal-matrix interface to determine a location at which excess Si atoms remain.

7. The method of claim 6, wherein the relative formation energies of single Si atoms are substantially greater in an amorphous suboxide matrix than in a crystalline Si bulk or at a nanocrystal-matrix interface.

8. The method of claim 1, wherein said generating the kinetic model includes simplifying an amorphous suboxide structure using a rigid diamond-lattice model, having silicon atoms at lattice sites and oxygen atoms at Si—Si bond centers.

9. The method of claim 1, wherein said generating the kinetic model includes permitting oxygen atoms to diffuse through oxygen-empty sites.

10. The method of claim 9, further comprising determining an extent of a diffusion of O atoms by calculating corresponding activation energies of Si neighbors of the O atoms.

11. The method of claim 1, wherein said using kinetic Monte Carlo simulations includes evaluating an oxidation state of at least one Si atom by counting a number of neighboring oxygen atoms of the at least one Si atom.

12. The method of claim 1, wherein said using kinetic Monte Carlo simulations includes controlling a magnitude of Si supersaturation by varying a number of O-empty sites.

13. The method of claim 1, wherein the profile comprises at least one of shapes of the silicon nanocrystals in the oxide matrix, a size distribution of the silicon nanocrystals in the oxide matrix, or a spatial arrangement of the silicon nanocrystals in the oxide matrix.

14. The method of claim 1, further comprising receiving, by the computing device, the fundamental data representative of the processes that can occur in the oxide matrix during the one or more material processing operations on the oxide matrix.

15. An article of manufacture including a non-transitory computer-readable medium having instructions stored thereon that, if executed by a computing device, cause the computing device to perform operations comprising:
generating, from fundamental data representative of processes that can occur in an oxide matrix during one or more material processing operations on the oxide matrix, a kinetic model representative of reactions that contribute substantially to formation of silicon nanocrystals in the oxide matrix; and
generating, from the kinetic model, data representative of a profile for the formation of the silicon nanocrystals in the oxide matrix, including predicting the formation of the silicon nanocrystals using kinetic Monte Carlo simulations based at least in part on oxygen diffusion.

16. The article of manufacture of claim 15, further comprising generating the fundamental data representative of the processes that can occur in the oxide matrix during one or more material processing operations on the oxide matrix, wherein said generating the fundamental data includes calculating changes in a total energy of silicon suboxide matrices by varying a Si:O ratio to determine a strain energy or a suboxide penalty energy for a chemical phase separation of silicon and silicon dioxide.

17. The article of manufacture of claim 15, further comprising generating the fundamental data representative of the processes that can occur in the oxide matrix during one or more material processing operations on the oxide matrix, wherein said generating the fundamental data includes calculating formation energies of single Si atoms that exist at various states in an oxide matrix to determine incorporation of the single Si atoms in a Si—O bond network.

18. The article of manufacture of claim 15, further comprising generating the fundamental data representative of the processes that can occur in the oxide matrix during one or more material processing operations on the oxide matrix, wherein said generating the fundamental data includes calculating relative formation energies of single Si atoms in a crystalline silicon, an amorphous suboxide matrix, and a nanocrystal-matrix interface to determine a location at which excess Si atoms remain.

19. The article of manufacture of claim 15, wherein said generating the kinetic model includes simplifying an amorphous suboxide structure using a rigid diamond-lattice model, having silicon atoms at lattice sites and oxygen atoms at Si—Si bond centers.

20. The article of manufacture of claim 15, wherein said generating the kinetic model includes permitting oxygen atoms to diffuse through oxygen-empty sites.

21. A system, comprising:

a processing unit; and a tangible computer-readable medium coupled to the processing unit and having instructions stored thereon, the instructions comprising:

instructions to generate, from fundamental data representative of processes that can occur in an oxide matrix during one or more material processing operations on the oxide matrix, a kinetic model representative of reactions that contribute substantially to formation of silicon nanocrystals in the oxide matrix; and instructions to generate, from the kinetic model, data representative of a profile for the formation of the silicon nanocrystals in the oxide matrix, including instructions to predict formation of the silicon nanocrystals using kinetic Monte Carlo simulations based at least in part on oxygen diffusion.

22. The system of claim 21, wherein the instructions further comprise instructions to generate the fundamental data representative of the processes that can occur in the oxide matrix during the one or more material processing operations on the oxide matrix, wherein the instructions to generate the fundamental data include instructions to calculate changes in a total energy of silicon suboxide matrices by varying a Si:O ratio to determine a strain energy or a suboxide penalty energy for a chemical phase separation of silicon and silicon dioxide.

23. The system of claim 21, wherein the instructions further comprise instructions to generate the fundamental data representative of the processes that can occur in the oxide matrix during the one or more material processing operations on the oxide matrix, wherein the instructions to generate the fundamental data include instructions to calculate formation energies of single Si atoms that exist in excess at various states in the oxide matrix to determine incorporation of the single Si atoms in a Si—O bond network.

24. The system of claim 21, wherein the instructions further comprise instructions to generate the fundamental data representative of the processes that can occur in the oxide matrix during the one or more material processing operations on the oxide matrix, wherein the instructions to generate the fundamental data include instructions to calculate relative formation energies of single Si atoms in a crystalline silicon, an amorphous suboxide matrix, and a nanocrystal-matrix interface to determine a location at which excess Si atoms remain.

25. The system of claim 21, wherein the instructions to generate the kinetic model include instructions to simplify an amorphous suboxide structure using a rigid diamond-lattice model, having silicon atoms at lattice sites and oxygen atoms at Si—Si bond centers.

26. The system of claim 21, wherein the instructions to generate the kinetic model include instructions to permit oxygen atoms to diffuse through oxygen-empty sites.

* * * * *

UNITED STATES PATENT AND TRADEMARK OFFICE
CERTIFICATE OF CORRECTION

| | | |
|---|---|---|
| PATENT NO. | : 8,036,864 B2 | Page 1 of 1 |
| APPLICATION NO. | : 11/537423 | |
| DATED | : October 11, 2011 | |
| INVENTOR(S) | : Hwang et al. | |

It is certified that error appears in the above-identified patent and that said Letters Patent is hereby corrected as shown below:

On the Title Page, item (56), under "Other Publications", Lines 4-5, delete "Structure adn Oxidatio kinetics of teh Si(100)-SiO2 interface," and insert -- Structure and Oxidation kinetics of the Si(100)-SiO2 interface, --.

On the Title Page, item (56), under "Other Publications", Line 7, delete "su=ynthesis" and insert -- synthesis --.

On the Title Page 2, item (56), under "Other Publications", Line 3, delete "Confinment" and insert -- Confinement --.

Column 1, line 4, below Title, insert -- RELATED APPLICATION --.

Column 10, line 5, in Claim 12, delete "O-empty" and insert -- oxygen-empty --.

Column 11, line 17, in Claim 21, delete "predict formation" and insert -- predict the formation --.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,036,864 B2 | |
| APPLICATION NO. | : 11/537423 | |
| DATED | : October 11, 2011 | |
| INVENTOR(S) | : Gyeong S. Hwang et al. | |

It is certified that error appears in the above-identified patent and that said Letters Patent is hereby corrected as shown below:

In the Specification

Column 1

Lines 8-9, in paragraph under the title insert -- This Invention was made with government support under Grant no. 0449373 and 0304026 awarded by the National Science Foundation. The government has certain rights in the invention. --

Signed and Sealed this
Twenty-third Day of June, 2015

Michelle K. Lee
*Director of the United States Patent and Trademark Office*